May 8, 1928.

C. W. WHITE

VEHICULAR WHEEL

Filed May 14, 1921

1,669,223

Inventor
Clarence W. White.

By his Attorney

Patented May 8, 1928.

1,669,223

UNITED STATES PATENT OFFICE.

CLARENCE WATSON WHITE, OF NORTH BENNINGTON, VERMONT.

VEHICULAR WHEEL.

Application filed May 14, 1921. Serial No. 469,629.

My invention relates to vehicles and more particularly to the wheeled devices employed therewith and the method of attachment, and has for an object to provide a wheel having roller bearings as a part of the structural features thereof which are retained in a simple and highly effectual manner in the hub of the wheel.

Generally described, my invention includes a wheel preferably of the steel web type, the web thereof comprising two similar oppositely disposed sides or faces riveted or otherwise secured together to make a semicircular peripheral flange for containing a resilient tire of different materials. The hub of this wheel has a drawn portion that admits of the insertion of a tubular raceway for a series of rolls whose end thrusts are directed against the wheel proper or sheet metal web thereof.

Another feature of my improvement generally described is the axle, which consists of an ordinary cylindrical stud having a shoulder or collar integral therewith formed by a stamping process familiar in metal working arts and having also a cap riveted down in the usual manner; the shoulder and riveted top with the usual washers forming the side bearings for the wheel, the rollers being in immediate contact with the cylindrical surface of the stud.

The stud upon which the wheel is thus operably supported has an extending end preferably of the same diameter as the roller bearing portion, for insertion in the bolster or other portion of the vehicle to which the wheel is to be attached, means being provided for retaining the stud permanently in position which in the preferred form illustrated consists of a transverse hole through which a pin or screw can be inserted, thereby retaining it fixedly in place.

Figure 1:
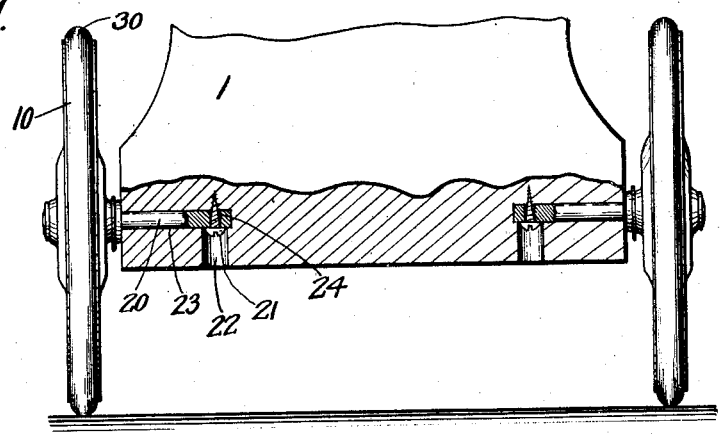
Figure 1 is a partial view of a portion of a child's vehicle in connection with which my invention is illustrated, having two wheels at respective ends.

Having reference to the drawings, the numeral 1 represents the bolster or body portion of a vehicle upon which are shown attached at its two ends the two wheels 10, supported on studs 20, which in turn are secured to the bolster 1 by screws 21 inserted through the transverse openings 22. The stud 20 is inserted through the horizontal hole 23 in the bolster 1, a transverse hole 24 having been provided in the end of the stud 20 for the insertion of the screw.

Figure 2:
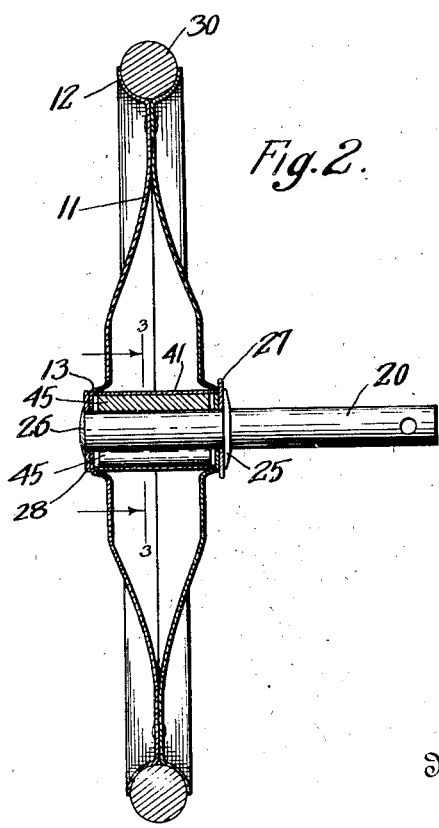
Fig. 2 is a diametral sectional view of one of the wheels shown in Fig. 1.

The stud 20 as best shown in Fig. 2 has the collar 25 preferably pressed into shape as an integral part of the stud 20 at a suitable distance from the outer end of the stud to supply a thrust bearing for supporting the wheel thereon, the inner face of the shoulder 25 being flat and adapted to receive the end thrust of the wheel as it rotates upon the stud.

The wheel 10 is made up of two similar web members 11 (see Fig. 2) which are oppositely disposed and in the form shown have similar circumferential flanges 12 to form a socket for the rubber tire 30 to serve as a resilient tread for the wheel. The web portions may be secured together to form the wheel 10 by riveting, welding or otherwise as may be most convenient, but in the practice of my invention in its preferred form I accomplish this end by the familiar process of spot welding, where the flat portions of the members 11 contact immediately within the circle of the flange portions 12.

Figure 3:
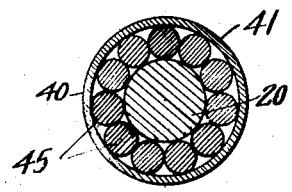
Fig. 3 is an enlarged sectional view of the roller bearing taken on the line 3—3 of Fig. 2.

The wheel has a central hole that extends through the web portions that serves merely as clearance opening for the stud 20, the wheel proper being supported upon a roller bearing 40 which comprises an outer shell race or tube 41 and a series of similar rolls 45 which when each roll is resting upon the inner face of the shell 41, form a continuous circular series, their corresponding inner surfaces adapted to rest upon the stud 20 as shown in Figs. 2 and 3.

The central portions of the web 11 are drawn outwardly in opposite directions so as to form circular recessed portions 13 surrounding the central openings of the web, into which recesses fit the opposite ends of the shell 41 which in the preferred form of my invention has a straight open end, as seen in Fig. 2.

The diameter of the recessed openings 13 is first formed slightly less than that of the outer diameter of the shell 41, the respective edges of the recessed portion being made to flare or taper and then the two web portions 11 are brought into close contact, one registering immediately opposite to the other, and respective ends of the tube 41 are brought into permanent contact with the recessed portions 13 so that the roller bearing 40 is firmly incorporated as a fixed operable element of the wheel. Thus the circular sides of the recessed portions 13 formed as a portion of the web 11 furnish the respective end guide or thrust walls for the rolls 45, thereby constituting an extremely simple and highly efficient housing for the rolls.

The stud is first prepared with the shoulder portion formed thereon, while the opposite end 26 is left straight until inserted in the roll bearing of the wheel. The wheel with the rolls inserted within the shell 41 is placed upon the stud as shown in Figs. 2 and 3, the washer 27 being interposed between the shoulder 25 and the adjacent face of the web member 11. Another washer 28 is likewise provided upon the stud against the opposite web 11, whereupon the riveted head 26 is formed in any suitable manner against the face of the washer 28 leaving sufficient clearance space between the inner faces of the riveted cap 26 and the shoulder 25.

I am aware that roller bearings have been used in which containing shells are employed for the outer raceway member of such bearings, said raceway itself usually being adapted to contain the rollers in position and also providing end thrust for the rolls therein contained. I do not therefore desire to claim this construction broadly. I am, however, not aware of a wheel of this type having been made previous to my use as herein disclosed, in which an open raceway is employed the surfaces of the wheel thus forming a coacting guiding or containing member.

Other advantages of the disclosure of my present invention are to be found in the simplicity and economy of use of the parts as here shown. Furthermore, the integral shoulder that forms a bearing for one side of the wheel hub, together with the riveted cap, also a part of the stud containing the shoulder, supply a permanent union between the wheel and its supporting axle, which adds to the durability of the device and thereby increases its usefulness to a very large degree.

Children's devices, as a rule, when they become defective in vital parts, are not repaired as often or as readily as other apparatus. Therefore, thus providing a durable means for securing a wheel to its axle, especially when used in connection with children's devices, is one of the chief objects of my present disclosure. The stud bearing thus forming a permanent connection with the wheel is similarly secured in a practical and efficient manner to the device to which it is immediately attached by the very simple and effective means described, wherein the stud is inserted in a hole provided for the purpose, it only remaining to supply means for retaining the stud within its socket. This is done by means of the screw 24, in connection with the device shown where my wheel is attached to the wooden bolster of a child's vehicle. The screw 21 is a wood screw and is passed through the orifice 24 in the end of the stud 20, and thence threaded into the substance of the wooden member to which it is attached. Obviously this connection may be made by driving a nail through the hole in the stud into the wood, but preferably in view of the fact that wood screws are of universal use and therefore easily obtainable, the wood screw is shown as a preferable means when my wheel is used in connection with wooden vehicles or wooden bolsters or axles of such vehicles.

Having described my invention, what I claim is:

1. A vehicular wheel comprising a pair of centrally apertured discs secured face to face with their outer edges separated to form a peripheral tire receiving groove, and with their central portions shouldered outwardly to form a hub and a raceway casing held within the hub between the shouldered portions and containing bearing rollers arranged around its internal surface.

2. A vehicular wheel comprising a pair of centrally apertured discs secured face to face with their central portions offset outwardly to form a hub with the apertures in alignment, said apertures being of sizes to fit the axle on which the wheel is to be supported, an open ended raceway shell held within the hub by the offset central portions, and bearing rollers arranged around the internal surface of the shell and confined therein against endwise movement by the abutting offset central portions.

3. A vehicular wheel comprising a pair of centrally apertured disc-like webs secured face to face with their outer edges separated to form a peripheral tire receiving groove and with their central portions spaced apart and offset outwardly and then radially toward the axis of the apertures to form a hub, an open ended raceway shell held within the hub by the offset central portions, and bearing rollers arranged around the inner surface of the shell and confined against endwise movement therein by the abutting offset central portions.

In testimony whereof I have hereunto set my hand.

CLARENCE WATSON WHITE.